United States Patent [19]

Hagiwara

[11] Patent Number: 5,357,245
[45] Date of Patent: Oct. 18, 1994

[54] COMMUNICANT VERIFIER

[75] Inventor: Takashi Hagiwara, Yokohama, Japan

[73] Assignee: Fujitsu Limited, Kawasaki, Japan

[21] Appl. No.: 159,698

[22] Filed: Dec. 1, 1993

Related U.S. Application Data

[63] Continuation of Ser. No. 819,663, Jan. 13, 1992, abandoned, which is a continuation of Ser. No. 585,678, Sep. 20, 1990, abandoned.

[30] Foreign Application Priority Data

Sep. 20, 1989 [JP] Japan .................. 1-244722

[51] Int. Cl.$^5$ ................................ H04Q 1/00
[52] U.S. Cl. .................... 340/825.34; 340/825.54; 340/313; 379/199
[58] Field of Search .............. 340/825.54, 825.34, 340/825.44, 825.52, 313; 379/199, 200

[56] References Cited

U.S. PATENT DOCUMENTS

| | | | |
|---|---|---|---|
| 4,393,278 | 7/1983 | Miyoshi | 379/199 |
| 4,447,676 | 5/1984 | Harris et al. | 379/199 |
| 4,559,417 | 12/1985 | Komuro et al. | 379/199 |
| 4,578,540 | 3/1986 | Borg et al. | 379/199 |
| 4,817,133 | 3/1989 | Takahashi et al. | 379/199 |
| 4,882,579 | 11/1989 | Siwiak | 340/825.44 |
| 4,926,470 | 5/1990 | Sanford | 379/199 |
| 4,942,598 | 7/1990 | Davis | 379/199 |

FOREIGN PATENT DOCUMENTS

0269978 6/1988 European Pat. Off. .
2451075 10/1980 France .

OTHER PUBLICATIONS

Patent Abstracts of Japan, vol. 012, No. 094, Mar. 26, 1988 for JP-A-62-225053 (Toshiba) Oct. 3, 1987.
Patent Abstracts of Japan, vol. 012, No. 101, Apr. 2, 1988 for JP-A-62-231558 (Mitsubishi) Oct. 12, 1987.
Patent Abstracts of Japan, vol. 012, No. 189, Jun. 2, 1988 for JP-A-62-293865 (N.T.T.) Dec. 21, 1987.

*Primary Examiner*—Donald J. Yusko
*Assistant Examiner*—Brian Zimmerman
*Attorney, Agent, or Firm*—Staas & Halsey

[57] ABSTRACT

An ID memory part memorizes an ID such as a telephone number that identifies a communicant, and a use frequency memory part memorizes a corresponding use frequency. When a communication apparatus takes a sending action, a writing part receives the ID from an addressee communicant and registers it in the ID memory part. In case the ID memory part does not have any unused memory region at this registering time, the least frequently used ID is deleted from the ID memory part and the memory region that becomes unused as the result registers the received ID. When a communication apparatus takes a receiving action, a comparison part receives the ID from an addresser communicant and sequentially compares the ID with each ID memorized in the ID memory part, and has the communication apparatus continue the receiving action only when a conformance is detected. A use frequency updating part updates the use frequency on the use frequency memory part corresponding to the communicant's ID, when the communication apparatus takes a communication action. Thus, an ordinary sending operation alone automatically registers the ID. By properly deleting the least frequently used ID on the ID memory part at an automatic registering time, a new ID is automatically registered without any problem, which makes the registering operation further simplified.

8 Claims, 6 Drawing Sheets

COMMUNICANT VERIFIER

This application is a continuation, of application Ser. No. 7/819,663, filed Jan. 13. 1992, now abandoned, which is a continuation of Ser. No. 585,678, filed Sep. 20, 1990, now abandoned.

BACKGROUND OF THE INVENTION

1. Field of the Invention

This invention relates to a communicant verifier in a communication apparatus. It comprises a memory for storing a communicant's ID (identification) and prevents a wrong connection by comparing the received ID with the ID stored in the memory.

2. Description of the Related Art

Recently with the widespread use of communication apparatuses like facsimile (FAX) machines, problems have arisen such as communications being made to a wrong person due to a wrong line connection and frequent receipt of direct FAX mail. As a result, a technology for preventing such an unnecessary communication has been sought.

In a commonly used existing technology for preventing an unnecessary communication, a user manually stores his communicant ID in a memory and this ID is compared with the ID received from the communicant at the beginning of a communication for an approval of a communication.

FIG. 1 is a block diagram based on the above described technology. In FIG. 1, a communication apparatus 10 comprises a memory 13 for registering the ID inputted manually as discussed above and a comparator 12 for comparing the communicant's ID inputted via a communication control part 11 at a data receiving time with the stored ID in the memory 13. Only when a comparison result at the comparator 12 shows that the above IDs conform with each other, a signal is sent to the communication control part 11 approving continuation of receiving a signal. When a comparison result at the comparator 12 shows that the above IDs do not conform with each other, a different signal is sent to the communication control part 11 prohibiting continuation of the receipt.

However, in the above example of the existing technology, when data are received from a new communicant, his exact ID must be registered manually each time. Therefore, although an unwanted receipt is excluded, the cumbersome work of a manual registration is necessary. Thus, the prior art has a problem that the procedure required before a desired receipt is completed is complicated.

SUMMARY OF THE INVENTION

This invention is made based on the above background. It aims to enable automatic registration of the ID to be compared for conformance with the ID received at the beginning of a data receipt in the memory of the communication apparatus.

Namely, according to this invention, a communicant verifier that verifies a communicant and determines whether or not to continue a communication with him, before a communication apparatus like a FAX machine begins communication with the communicant, has the following configuration.

To start with, an ID memory part memorizes an ID, such as a telephone number, that identifies the communicant.

A use frequency memory part memorizes a use frequency of each ID memorized in the ID memory part.

A writing part receives and registers a communicant's ID when the communication apparatus sends data. If there is no unused memory area in the ID memory part at this registration time, the writing part deletes the least frequently used ID from the ID memory part by referring to the use frequency memory part and registers the received ID in the resulting unused memory region.

A comparison part receives the ID from the communicant at the beginning of a data receipt by the communication apparatus and sequentially compares the ID with each ID stored in the ID memory part, and continues the receiving process only when a conformance is detected.

A use frequency revising part updates the use frequency in the use frequency memory part corresponding to the communicant's ID when a communication, i.e. both receiving and sending, is in progress.

The above configuration enables an exclusion of an unwanted data receipt, by automatically registering the communicant's ID in the ID memory part at a sending time and comparing the communicant's ID with the content of the ID memory part. In this case, since an ordinary sending operation alone enables an automatic ID registration, a cumbersome manual registration becomes unnecessary.

Although an ID often becomes a complex number sequence depending on the kind of CCITT advice, since this invention enables an automatic registration of such a number sequence, compared with an existing manual registration, registration errors can be reduced, thus improving reliability.

Also, by memorizing the use frequency of each ID, when there is no empty memory region in the ID memory part at a time of registering a new ID, the least frequently used ID is deleted from the ID memory part. This enables an automatic registration of a new ID without any problem. Thus, a registration operation becomes much simpler.

BRIEF DESCRIPTION OF THE DRAWINGS

A person in this business can easily understand other objects and configurations of this invention from the attached drawings and the description of the preferred embodiment of this invention.

In the drawings.

DESCRIPTION OF THE PREFERRED EMBODIMENT

Explanation of the Principle

Figure 1:
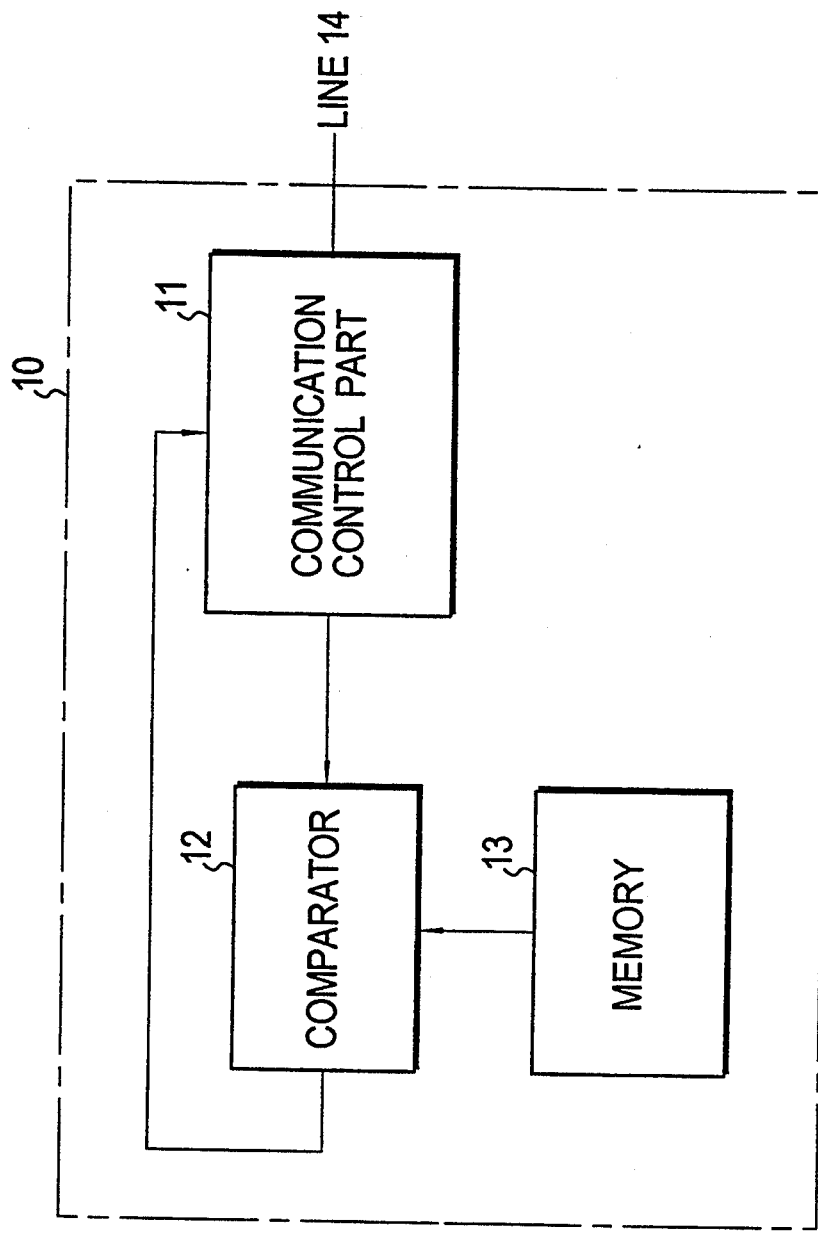
FIG. 1 is a configuration diagram of a prior art.
Figure 2:
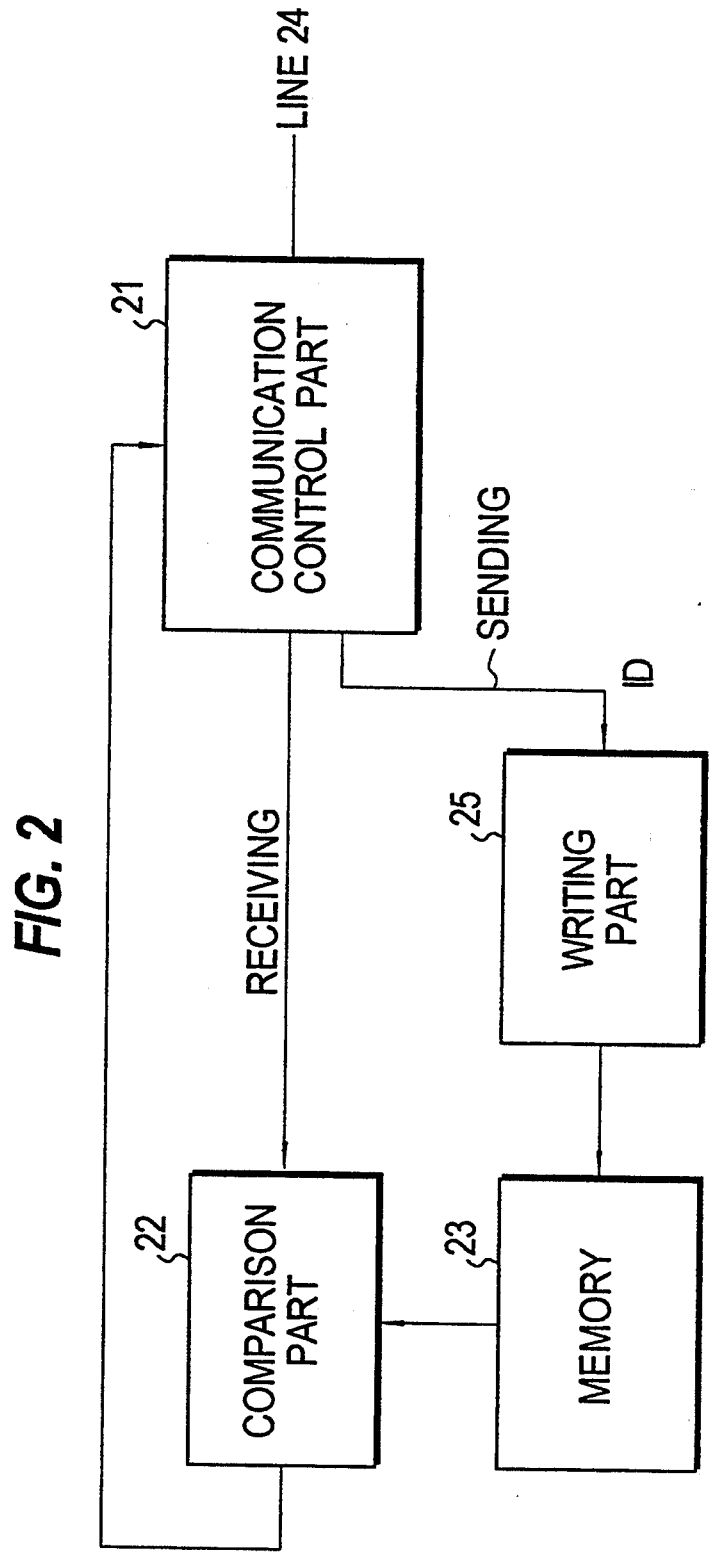
FIG. 2 is a black diagram of this invention.

FIG. 2 is a configuration diagram of this invention.

A communication control part 21 controls a communication processing using a FAX machine or the like (not specifically shown in the drawing) that is connected to the communication control part 21 between a plurality of communicants connected through a line 24.

A memory 23 memorizes the ID of a communicant's terminal.

A writing part 25 automatically writes in the memory part 23 the ID of the communicant connected through the line 24 under control of the communication control part 21 at a time of sending communication data such as FAX data.

A comparison part 22 compares the communicant's ID received through the line 24 under control of the communication control part 21 at a time of receiving communication data such as FAX data with the ID automatically registered in the memory 23, and approves the communication control part 21 of a data receipt continuation only when the IDs conform with each other, and disapproves the communication control part 21 of a data receipt continuation when the IDs do not conform with each other.

According to the above principle configuration of this embodiment, since an ID is automatically stored in the memory 23 at the time of sending communication data, a manual ID registration that is necessary in the prior art becomes unnecessary. That is, in this invention the ID of the communicant to whom data are sent by the local communication apparatus is automatically registered. In this case, since a user can automatically register an ID by an ordinary sending processing alone, compared with a manual registration, the operation is simplified, and registration errors are reduced.

The above principle configuration of this invention can also be in the following manner. When an area for memorizing a use frequency of an automatically registered ID is set and the memory content of the memory 23 exceeds the memory capacity of the memory 23 at a time of registering a new ID in the memory 23, the writing part 25 deletes the least frequently used ID from it and registers the new ID in the memory 23 automatically.

This avoids the need to check whether or not the capacity of the memory 23 is enough at a registration time, and further simplifies the registering operation.

DESCRIPTION OF THE PREFERRED EMBODIMENT

Figure 3:
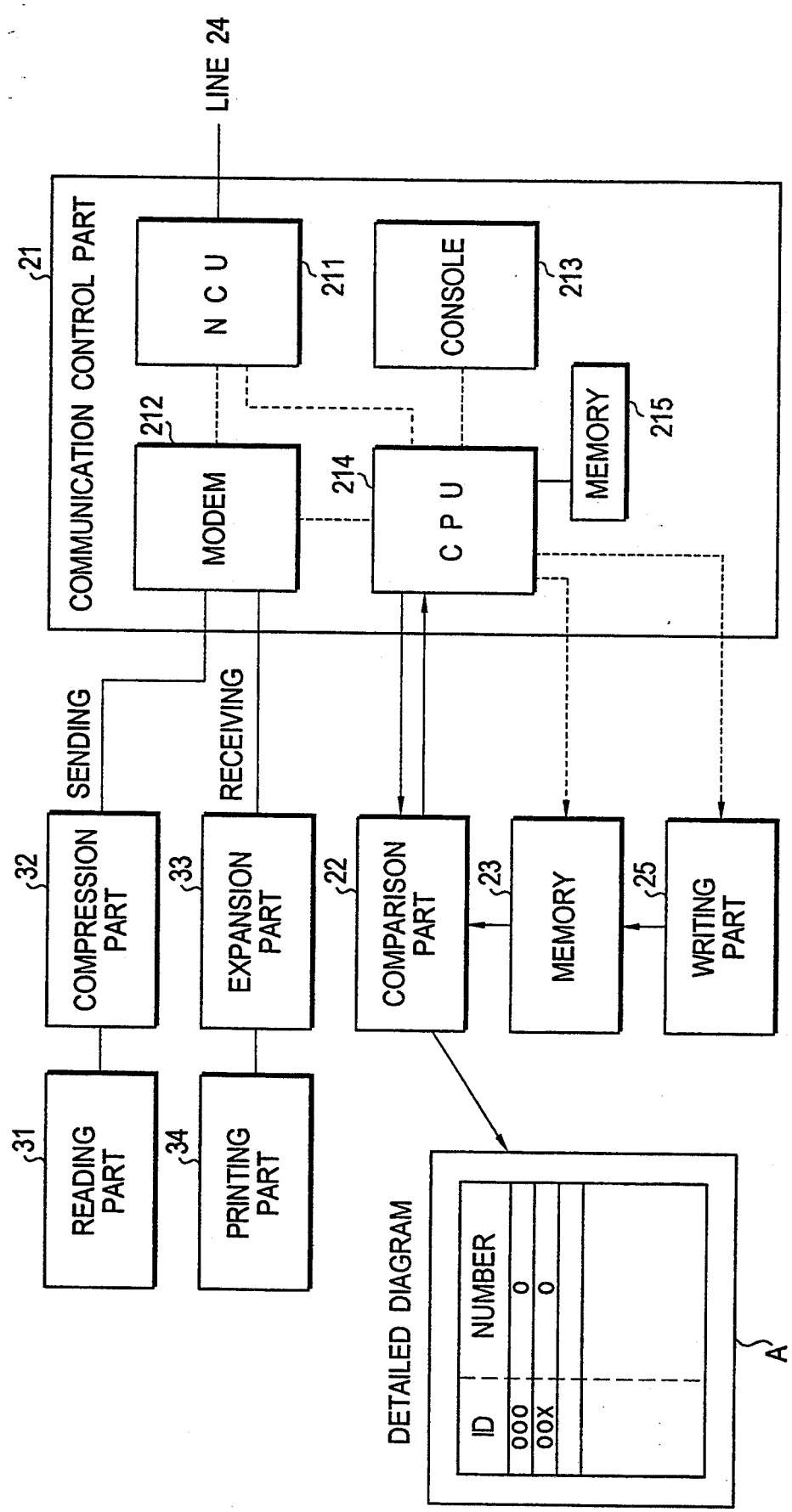
FIG. 3 is a configuration chart of an embodiment of this invention.

FIG. 3 is a configuration diagram of the preferred embodiment of this invention, showing an example of a configuration applicable to a FAX communication apparatus.

In FIG. 3, a communication control part 21, a comparison part 22, a memory 23, a line 24 and a writing part 25 correspond to parts with the same numbers as those in FIG. 2 and their functions are the same.

The communication control part 21 comprises a network control unit part (hereafter abbreviated as NCU) 211, a MODEM 212, a console 213, a CPU 214 and a memory 215.

The NCU 211 detects a call-up signal from the line 24.

The MODEM 212 converts sending data to a sending signal by a modulation and outputs them through the NCU 211 to line 24 at a sending time. The MODEM 212 inputs a receiving signal from the line 24 through the NCU 211 and converts it to receiving data by a demodulation at a receiving time.

A user can operate data sending or data receiving with various switches on the console 213.

The CPU 214 performs an ordinary data sending-/receiving processing according to a communication control program memorized in the memory 215, and also executes a processing of automatically registering an ID etc, described later.

The MODEM 212 of the communication control part 21 is connected to a reading part 31 for realizing a FAX sending/receiving function, a compression part 32, an expansion part 33 and a printing part 34. That is, when a FAX message is sent, the reading part 31 reads the original and converts it to image data. The compression part 32 then compresses the image data based on the MH (Modified Huffman) method and outputs them to the MODEM 212 as sending data. When a FAX message is received, the expansion part 33 restores the image data based on the MH method from the received data output from the MODEM 21 2, and the printing part 34 prints the image data on paper.

The writing part 25 automatically registers in the memory 23 the ID sent from the sending communicant through the communication control part 21 at a sending protocol execution time, i.e. at a data sending time.

The comparison part 22 compares the communicant's ID with each ID memorized in the memory 23 at a receiving protocol execution time, i.e. at a data receiving time. If they conform with each other, the comparison part 22 approves the CPU 214 in the communication control part 21 of a receiving continuation. If they do not conform, the comparison part 22 prohibits the CPU 21 4 from a receiving continuation.

Figure 4:
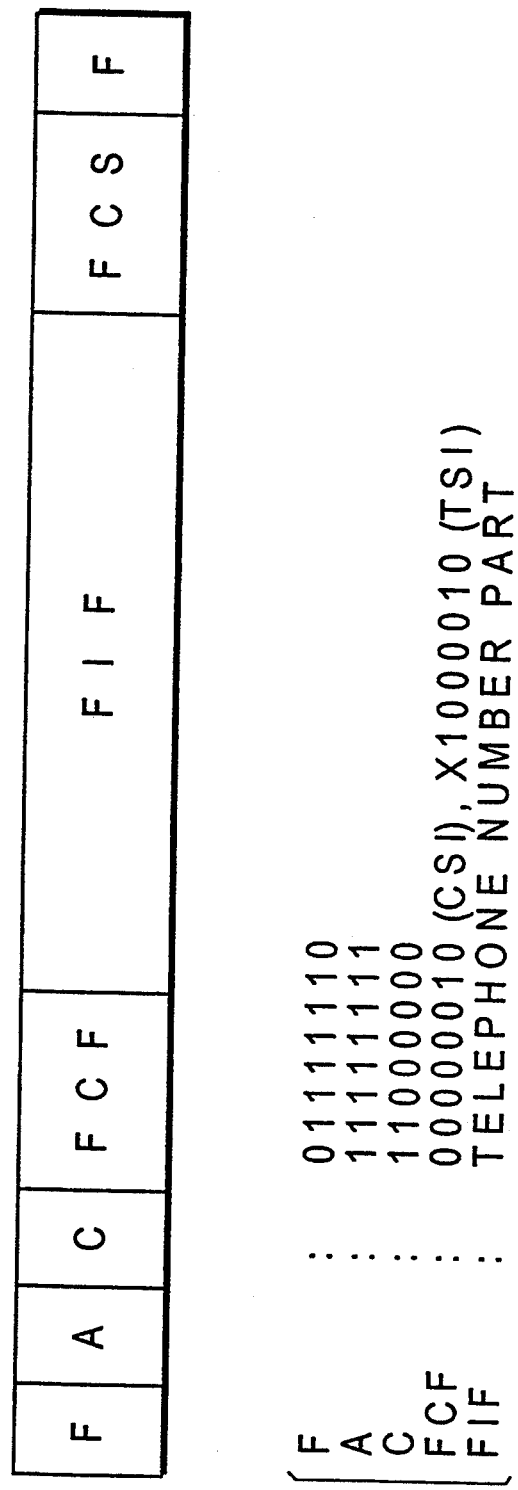
FIG. 4 shows a frame format of a facsimile's transmission control procedure.

In the embodiment shown in FIG. 3, a binary code signal method is adopted as a FAX transmission method. According to the binary code signal method, a control signal is configured and transmitted in a frame based on a high level data link control procedure (HDLC), whose frame configuration is shown in FIG. 4. FIG. 4 is based on the international standard "CCITT -T30".

In FIG. 4, a flag sequence "F" shows a frame division whose format is "01111110". Next, an address field "A" is fixed to a format "11111111" in a FAX communication. A control field "C" is fixed to a format "11000000" in a FAX communication.

A facsimile control field "FCF" and a facsimile information field "FIF" are set in an information field of an HDLC frame. Among the codes of various control signals set in the facsimile control field "FCF", the control signals called a CSI signal and a TSI signal explained later relate particularly to this invention. When a CSI signal is set, a "00000010" format is set. When a TSI signal is set, an "X1000010" format is set, where "X" is set to either "1" or "0" whose setting condition is irrelevant to this invention and its explanation is omitted here. Supplementary information to the control signal shown as the facsimile control field "FCF" is stored in the facsimile information field "FIF". When the CSI signal or the TSI signal described above is set, particularly a telephone number is stored. These details are explained later.

In FIG. 4, a frame checking sequence "FCS" is a 16 bit sequence for checking a transmission error on a receiving side, and is used for correcting an error based on a generator polynomial "$X^{15}+X^{12}+X^5+1$".

The actions of the embodiment configured as the above description are explained below. The following explanation of the action of the communication apparatus shown in FIG. 3, when it is a sending side apparatus and when it is a receiving side apparatus, is made by commonly referring to the drawing of a signal sequence shown in FIG. 5. The action explained below is based on the international standard "CCITT-T30".

First, the action centered on a sending side apparatus is explained.

Figure 5:
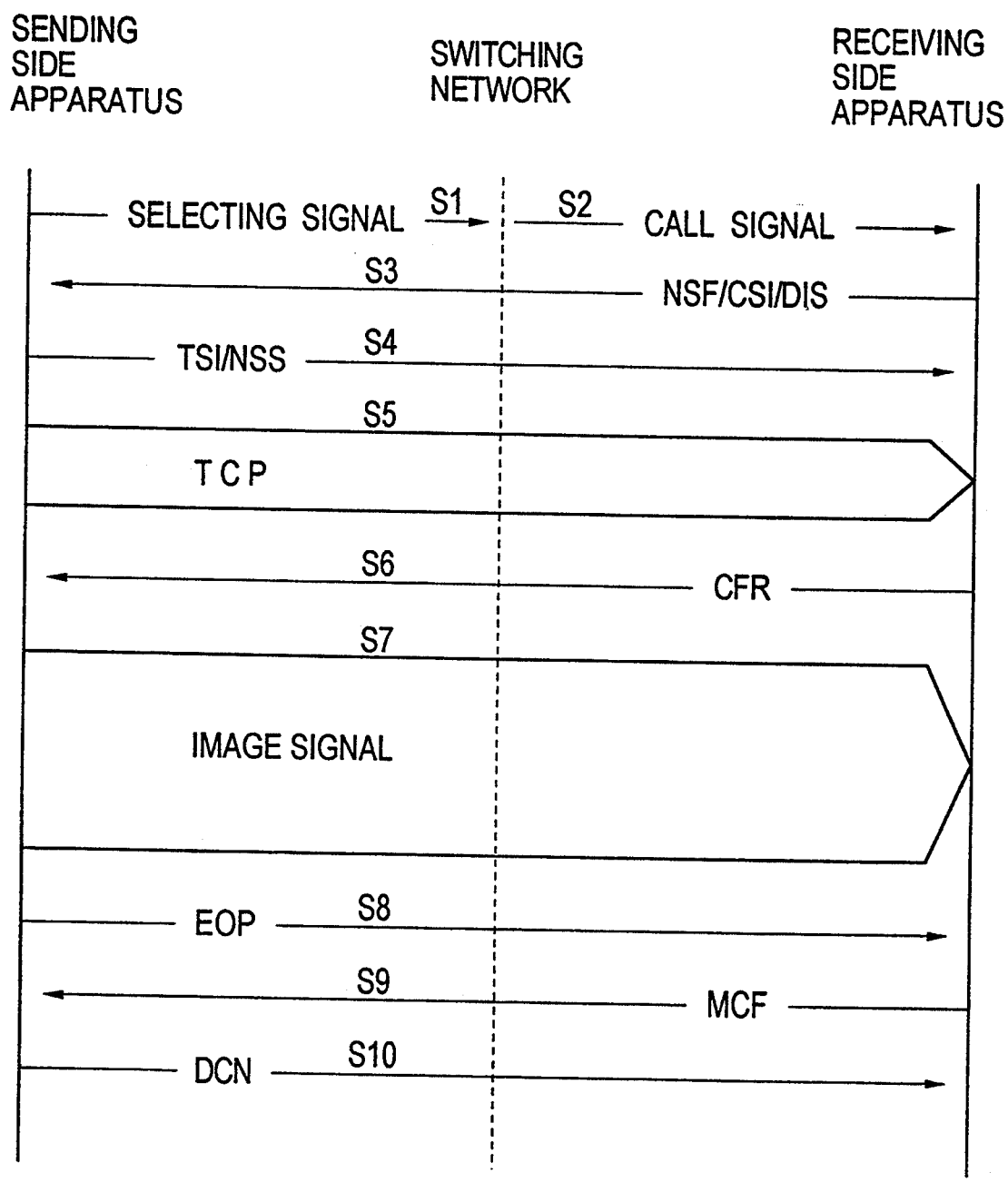
FIG. 5 shows a facsimile's transmission control procedure.

The user of the sending side apparatus inputs the addressee communicant's telephone number, i.e. ID by manipulating the console 213. This ID is sent as a selection signal from the CPU 214 through NCU 211 to the line 24. (FIG. 5, S1)

The network side (exchange office) analyzes the selection signal and sends the selected receiving side apparatus a call signal. (FIG. 5, S2)

The receiving side apparatus sends a control signal according to a facsimile transmission protocol to the sending side apparatus. These control signals comprise a DIS (Digital Identification Signal), a CSI (Called Subscriber Identification) signal, a NSF (Non-Standard Facilities) signal per the international standard "CCITT-T30". In this case, a code corresponding to each control signal described above is set in the facsimile control field "FCF" of the frame data of the FIG. 4's format sent to the sending side apparatus. Here, the NSF signal and the DIS are the control signals mainly for notifying the communication function of the receiving side apparatus. Also, the CSI signal is a control signal particularly associated with this invention and for notifying of the telephone number, i.e. ID, of the receiving side apparatus. This ID is set in the facsimile information field "FIF" of the frame data of the FIG. 4's format to which the CSI signal to be sent to the sending side apparatus is set. A concrete example of this setting action is later explained using FIG. 6. Above action is shown as S3 in FIG. 5.

The sending side apparatus receives and analyzes the above described control signal in the CPU 214 through the NCU 211 and identifies the communication function of the receiving side apparatus. Particularly at this time, the CPU 214 identifies the ID of the receiving side apparatus sent by using the frame set with the above described CSI signal, and sends this ID to the comparison part 22. At the same time, the CPU 214 sequentially reads out the ID written in the memory 23 and sends it to the comparison part 22. The following actions of the comparison part 22 and the writing part 25 relate particularly to this invention.

The comparison part 22 sequentially compares the received ID with the ID read out from the memory 23. When they conform with each other, the comparison part 22 outputs a conformance signal to the CPU 214, whence the CPU 21 4 has the writing part 25 add one (1) to the numerical value of the number field corresponding to the particular ID within the memory 23. When the comparison part 22 detects a non-conformance, the comparison part 22 outputs a non-conformance signal to the CPU 21 4. In this case, since the received ID is not registered in the memory 23, the CPU 214 sends this received ID to the writing part 25 which writes this ID to the memory 23. Simultaneously, the CPU 214 has the writing part 25 set one (1) to the numerical value of the number field corresponding to the particular ID within the memory 23. At this time, if the number of the ID memorized in the memory 23 reaches the memory capacity, by judging the content of the number field on the memory 23, the CPU 214 detects the least frequently used ID, and registers a new ID after deleting the least frequently used ID. A large initial value is set in the number field of the memory 23, and the value decreases with time. Where the value becomes 0, the ID will be a subject to deletion from the memory.

Successively, the sending side selects the communication method (communication speed, resolution, etc.) depending on the communication function of the receiving side apparatus, and sends a control signal per facsimile transmission protocol to the receiving side apparatus. (FIG. 5, S4) The action of the receiving side apparatus in receiving these control signals is explained later.

After the control signal described above, the sending side apparatus further sends a TCF (Training Check) signal as a control signal. (FIG. 5, S5) This signal is a signal for checking whether or not the MODEM 212 on the receiving side can receive data at the transmission speed the sending side apparatus sets. In this case, a code corresponding to the TCF signal described above is set in the facsimile control field "FCF" of the frame data of the FIG. 4's format to be sent to the receiving side apparatus.

In response to sending the TCF signal described above, the receiving side apparatus returns a CFR (Confirmation to Receive) signal as a control signal indicating that the transmission of the facsimile message can start. (FIG. 5, S6) In this case also, a code corresponding to the CFR signal described above is set in the facsimile control field "FCF" of the frame data of the FIG. 4's format to be sent to the sending side apparatus.

After the above procedure enables to send a facsimile message (image signal) from the sending side apparatus, the reading part 31 reads the original, the compression part 32 compresses and codes the image data to become the sending data. The sending data are sent to the receiving side apparatus through the MODEM 212 and the NCU 211 within the communication control part 21, as well as the line 24 to the receiving side apparatus. (FIG. 5, S7) This image signal is different from a control signal, and is sent as a one page unit continuous bit sequence without being expanded to the frame of HDLC.

After sending the image signal is completed, the sending side apparatus sends an EOP (End of Procedure) signal, as a control signal indicating an end of procedure, to the receiving side apparatus. In return, the receiving side apparatus sends an MCF (Message Confirmation) signal, i.e. a control signal meaning a confirmation. (FIG. 5, S9) After receiving this signal, the sending side apparatus sends a DCN (Disconnect) signal, i.e. a control signal directing a severance of a call, to the receiving side apparatus, and finishes all the procedures. (FIG. 5, S10) Each control signal described above, similar to other control signals, sets a code corresponding to each control signal in the facsimile control field "FCF" of the transmitted frame data of the FIG. 4's format.

Second, the action centered on a receiving side apparatus is explained.

As explained earlier, after taking an action of automatically registering the ID of the receiving side apparatus to the memory 23 based on the sequence of S3 in FIG. 5, the sending side apparatus sends a TSI (Transmitting Subscriber Identification) signal and a NSS (Non-Standard facilities Set-up) signal, as control signals, to the receiving side apparatus. (FIG. 5, S4) The NSS signal is a control signal indicating which communication function of the receiving side apparatus is selected by the sending side apparatus. The TSI signal is a control signal that particularly relates to this invention, and is a control signal for notifying the telephone number, i.e. ID, of the sending side apparatus. This ID is set in the facsimile information field "FIF" of the frame data of the FIG. 4's format to which the TSI signal sent to the receiving side apparatus is set. A concrete example of this setting action is later explained using FIG. 6.

The CPU 214 of the receiving side apparatus identifies the ID of the sending side apparatus sent by using a frame set by the above described TSI signal, and sends this ID to the comparison part 22. Concurrently, the CPU 214 sends the comparison part 22 the ID written in the memory 23 by sequentially reading it out. The following actions of the comparison part 22 and the writing part 25 relate particularly to this invention.

The comparison part 22 sequentially compares the received ID with the ID read out from the memory 23. If they conform, the comparison part 22 outputs a conformance signal to the CPU 21 4. Then, the CPU 214 continues the receiving procedure of FIG. 5, S5 and after. At the same time, the CPU 21 4 has the writing part 25 add one (1) to the numerical value of the number field corresponding to the particular ID within the memory 23. (Refer to A of FIG. 3.) When the comparison part 22 detects a non-conformance, the comparison part 22 outputs a non -conformance signal to the CPU 214. In this case, since the received ID is not registered in the memory 23, the CPU 21 4 prohibits the continuation of the receiving procedure of FIG. 5, S5 and after, and shifts to a special prohibition procedure that is a procedure practiced from before and thus whose explanation is omitted here.

Based on the action described above, the CPU 214 of the receiving side apparatus continues the procedure of FIG. 5, S5 and after, and when the image signal is begun to be received (FIG. 5, S7), the image signal is converted to receiving data by a demodulation in the MODEM 212. The expansion part 33 restores the image data and the printing part 34 prints the image based on the image data on paper.

The procedures FIG. 5, S8 through S10 of and after the receiving action of the image signal described are as explained before.

Figure 6:
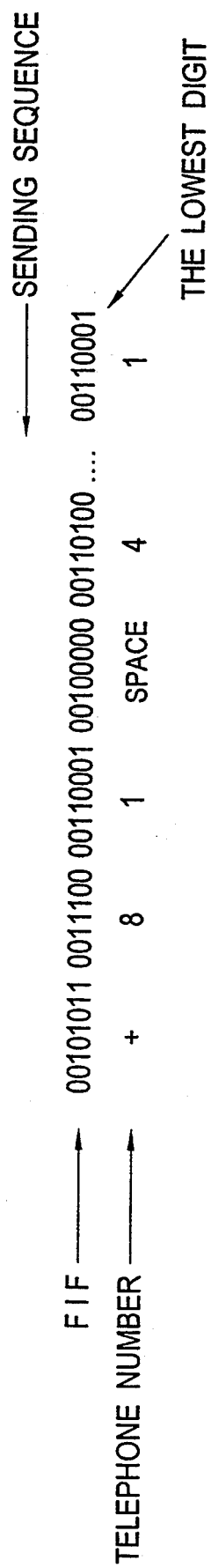
FIG. 6 Shows an example of a data configuration of an ID signal (telephone number) using a Facsimile Information Field (FIF).

In the FAX communication procedure, especially related to this invention, the ID of the receiving side apparatus or the sending side apparatus transmitted together with the CSI signal or the TSI signal is stored in the facsimile information field "FIF" of the frame data of the FIG. 4's format in the format exemplified in FIG. 6. The telephone number in this case is the international telephone number configured in the order of "a +sign, a country code, and domestic number". An example within Japan is like "+81447771111 ". Here, "81" is Japan's country code, "44" is the number taken the top "0" out from the area code of Kawasaki City "044", and "7771111" is an intra-area number. As shown in FIG. 6, each digit of a telephone number is expressed in eight (8) digits of a binary code, and sent sequentially from the lowest digit. When the total does not reach twenty (20) digits, a space is filled.

As explained so far, when the communication apparatus configured as shown in FIG. 3 acts as the sending side apparatus, the above described ID sent from the receiving side apparatus is automatically registered in the memory 23 by the writing part 25. When the communication apparatus shown in FIG. 3 acts as the receiving side apparatus, the ID sent from the sending side apparatus is sequentially compared with the ID stored in the memory 23 by a comparison part 22. If the communicant's ID is already registered in the memory 23, the communication control part 21 continues receiving data; and if not, it stops it. Thus, an ID registration becomes possible without requiring a manual registration of the ID of the communicant's side apparatus.

In the above described embodiment, the ID is stored "as is" to the memory 23, but the memory required can be made smaller by using an appropriate compression means. The following two methods are considered for the compression means.

[1]Only the lower digits of the ID is used.

In this method, at a sending time, after the CPU 21 4 selects the lower digits of the ID sent from the communicant as described earlier, the writing part 25 writes the data into the memory 23. Meanwhile, at a receiving time, after the CPU 214 selects the lower digits of the ID sent from the sending side, the comparison part 22 compares the data with the memory content of the memory 23.

[2]The entire ID is compressed by using an appropriate coding means.

In this method, at a sending/receiving time, the CPU 214 compresses the ID sent from the communicant e.g. to double digit data based on the CRC coding method.

In the embodiment described earlier, it is also possible to configure such that a predetermined value is equally subtracted across the board from a number value of the number field corresponding to the ID within the memory 23 at a certain time interval, until the value reaches zero (0) whence no further subtraction is made. This holds down the memory capacity used for indicating the number, even if the number value shown in the number field becomes large. In the embodiment described earlier, the value of the number field is added by one (1) both at a sending time and at a receiving time, but it is all right to do so only at either time, instead.

What is claimed is:

1. A communicant verifier for verifying a communicant and deciding whether a communication apparatus should continue communication based on a verifying result for the communicant, when the communication apparatus begins communication with the communicant, comprising:

ID memory means for memorizing an ID for identifying a communicant, writing means for receiving the ID for an addressee communicant and registering the ID in said ID memory means, when the communication apparatus performs a sending operation, and comparison means for receiving the ID from the addressee communicant, sequentially comparing the ID with each ID memorized in said ID memory means, and having the communication apparatus continue receiving only if conformance is detected, when the communication apparatus performs a receiving operation.

2. A communicant verifier for verifying a communicant and deciding whether a communication apparatus should continue communication based on a verifying result for the communicant, when the communication apparatus begins communication with the communicant, comprising:

ID memory means for memorizing an ID for identifying a communicant, use frequency memory means for memorizing use frequency of each ID to be memorized in said ID memory means, writing means for receiving a new ID for an addressee communicant, registering the new ID in said ID memory means, and deleting a least frequently used ID from said ID memory means by referring to said use frequency memory means and registering the new ID in said ID memory means at a memory region that becomes unused as a result of the deleting in case there is no unused memory region in said ID memory means upon receiving the new ID, when the communication apparatus performs a sending action, comparison means for receiving the ID from the addressee communicant, sequentially comparing the ID with each ID memorized in said ID memory means, and having the communication apparatus continue receiving only if conformance is detected, when the communication apparatus performs a receiving action, and use frequency updating means for updating the use frequency on said use frequency memory means corresponding to the communicant's ID, when the communication apparatus performs a communication action.

3. The communicant verifier according to claim 2, wherein said use frequency updating means updates the use frequency in said use frequency memory means corresponding to the communicant ID of at least one of the addressee and addressor communicants, when said communication apparatus performs sending and receiving actions, respectively.

4. The communicant verifier according to claim 2, wherein the ID of the communicant is a telephone number of the communicant.

5. The communicant verifier according to claim 2, wherein the ID transmitted from the communicant to the communication apparatus is transmitted using an HDLC frame to which a called subscriber identification signal is set by a binary code signal method.

6. The communicant verifier according to claim 2, wherein the ID transmitted from the communication apparatus to the communicant is transmitted using an HDLC frame to which a transmitting subscriber identification signal is set by a binary code signal method.

7. The communicant verifier according to claim 2, wherein said communication apparatus is a facsimile communication apparatus.

8. The communicant verifier according to claim 2, wherein said use frequency updating means comprises means for updating how recently said communication apparatus communicated with the communicant, and wherein said writing means deletes the least frequently used ID communicated with more than a predetermined time earlier.

* * * * *

UNITED STATES PATENT AND TRADEMARK OFFICE
CERTIFICATE OF CORRECTION

PATENT NO. : 5,357,245
DATED : October 18, 1994
INVENTOR(S) : Takashi HAGIWARA

It is certified that error appears in the above-indentified patent and that said Letters Patent is hereby corrected as shown below:

Column 1, line 5, delete "7/819,663" and insert --819,663--.

Column 2, line 51, delete "black" and insert --block--.

Column 8, line 36, insert a new paragraph indentation with the word "In"; and line 54, delete "the". (second occurrence).

Column 9, line 15, delete "the" (second occurrence) and insert --an--.

line 16, delete "addressee" and insert --addressor--; and line 24, delete "communicant's" and after "ID" insert --of the communicant--.

Signed and Sealed this

Twenty-fourth Day of January, 1995

Attest:

BRUCE LEHMAN

Attesting Officer     Commissioner of Patents and Trademarks